US012572031B2

(12) United States Patent
Drammeh et al.

(10) Patent No.: US 12,572,031 B2
(45) Date of Patent: Mar. 10, 2026

(54) OPTICAL MICROSTRUCTURE-CONTAINING LAMINATE FOR OPHTHALMIC LENS INCORPORATION

(71) Applicant: Essilor International, Charenton-le-pont (FR)

(72) Inventors: Ahmed Drammeh, Dallas, TX (US); Zbigniew Tokarski, Dallas, TX (US); Aref Jallouli, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 635 days.

(21) Appl. No.: 17/918,227

(22) PCT Filed: Apr. 13, 2021

(86) PCT No.: PCT/EP2021/059582
§ 371 (c)(1),
(2) Date: Oct. 11, 2022

(87) PCT Pub. No.: WO2021/209462
PCT Pub. Date: Oct. 21, 2021

(65) Prior Publication Data
US 2023/0194892 A1 Jun. 22, 2023

(30) Foreign Application Priority Data

Apr. 14, 2020 (EP) ..................................... 20315169

(51) Int. Cl.
*G02C 7/02* (2006.01)
*B29D 11/00* (2006.01)

(52) U.S. Cl.
CPC ........ *G02C 7/022* (2013.01); *B29D 11/00326* (2013.01); *B29D 11/0073* (2013.01); *G02C 2202/16* (2013.01); *G02C 2202/24* (2013.01)

(58) Field of Classification Search
CPC ................ G02C 7/022; G02C 2202/16; G02C 2202/24; B29D 11/00009; B29D 11/0073; B29D 11/00326
(Continued)

(56) References Cited

U.S. PATENT DOCUMENTS 8,482,857 B2 * 7/2013 Wolterink .............. H04N 23/57
264/1.36
10,386,654 B2 * 8/2019 Marshall ................ G02C 7/022
(Continued)

FOREIGN PATENT DOCUMENTS

EP 1887414 2/2008
EP 3220190 9/2017
(Continued)

OTHER PUBLICATIONS

High-performance Micro-optic Components, 2017, pp. 1-4 [online], [retrieved Apr. 1, 2025], retrieved from the Internet <URL: https://www.teledyne-si.com/en-us/Products-and-Services_/Documents/Optical%20Microlenses/2017-Microlens-Brochure-3%20FINAL.pdf >. (Year: 2017).*
(Continued)

*Primary Examiner* — James R Greece
(74) *Attorney, Agent, or Firm* — Norton Rose Fulbright US LLP

(57) ABSTRACT

The present disclosure relates to a laminate, comprising a first film including a pattern of microstructures debossed within a first surface of the first film, each microstructure of the debossed pattern of microstructures being an optical microstructure arranged such that a height of the first surface of the first film is greater than a height of each optical microstructure, and a second film that is laminated, via a first surface of the second film, to the first film at the first surface of the first film, wherein a delta between the height of the (Continued)

710 first surface of the first film and the height of each optical microstructure encapsulates, upon the lamination of the second film to the first film, a void fill material in at least a portion of at least one void defined by the delta.

15 Claims, 15 Drawing Sheets

(58) Field of Classification Search
USPC ..................................................... 359/159.01
See application file for complete search history.

(56) References Cited

U.S. PATENT DOCUMENTS

| 2006/0006336 | A1 | 1/2006 | Cano et al. |
| 2008/0030675 | A1 | 2/2008 | Dillon |
| 2008/0212193 | A1 | 9/2008 | Steenblik et al. |
| 2009/0153970 | A1 | 6/2009 | Lee et al. |
| 2010/0177380 | A1 | 7/2010 | Nagahama et al. |
| 2012/0057100 | A1 | 3/2012 | Masuda et al. |
| 2013/0052294 | A1 | 2/2013 | Wang et al. |
| 2014/0087140 | A1 | 3/2014 | Benson |
| 2015/0251480 | A1 | 9/2015 | Souparis et al. |
| 2016/0003992 | A1 | 1/2016 | Nagahama et al. |
| 2016/0306192 | A1 | 10/2016 | Marshall et al. |
| 2017/0131567 | A1 | 5/2017 | To et al. |
| 2017/0299898 | A1 | 10/2017 | Gallina et al. |
| 2017/0368569 | A9 | 12/2017 | Wolk et al. |
| 2020/0073147 | A1 | 3/2020 | Bakaraju et al. |
| 2022/0357595 | A1 | 11/2022 | Guillot et al. |
| 2023/0148025 | A1* | 5/2023 | Jallouli ............ B29D 11/00009 264/1.32 |

FOREIGN PATENT DOCUMENTS

| WO | WO 2010/135213 | 11/2010 |
| WO | WO 2012/067761 | 5/2012 |
| WO | WO 2016/168746 | 10/2016 |
| WO | WO 2018/076057 | 5/2018 |
| WO | WO 2021/090207 | 5/2021 |

OTHER PUBLICATIONS

Refractive Index for Some Common Liquids, Solids and Gases, 2017, pp. 1-5 [online], [retrieved Apr. 2, 2025], retrieved from the Internet <URL: https://web.archive.org/web/20170609085907/https://www.engineeringtoolbox.com/refractive-index-d_1264.html>. (Year: 2017).*

Patrick Jacques et al., Micro Lens Array Assembly for Optical Organic Substrate, 2019, pp. 1074-1080 [online], [retrieved Apr. 1, 2025], retrieved from the Internet <URL: https://ieeexplore.ieee.org/stamp/stamp.jsp?tp=&arnumber=8811353>. (Year: 2019).*

All You Should Know About Thermoplastic Materials, 2019, pp. 1-3 [online], [retrieved Apr. 2, 2025], retrieved from the Internet <URL: https://protoplastics.com/about-thermoplastic-materials/>. (Year: 2019).*

International Search Report and Written Opinion issued in Corresponding PCT Application No. PCT/EP2021/059571, dated May 11, 2021.

International Search Report and Written Opinion issued in Corresponding PCT Application No. PCT/EP2021/059569, dated Jul. 2, 2021.

International Search Report and Written Opinion issued in Corresponding PCT Application No. PCT/EP2021/059582, dated May 12, 2021.

* cited by examiner

*FIG. 1*
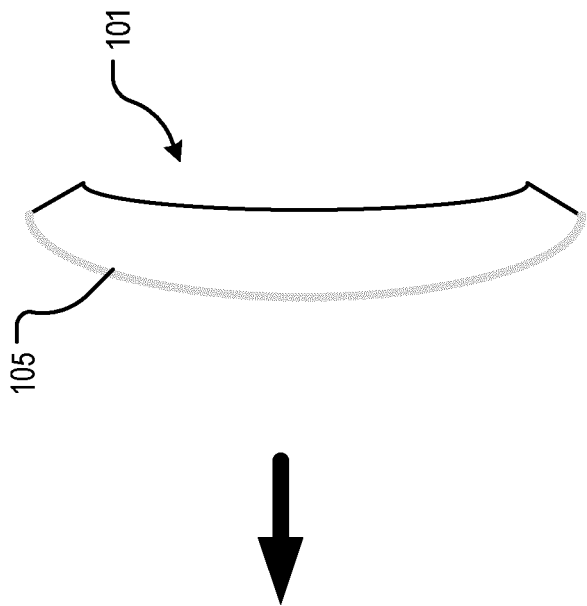
101
105
Environment

300

320 — APPLYING A BONDING SYSTEM BETWEEN A FIRST FILM AND A SECOND FILM

325 — LAMINATING THE FIRST FILM TO THE SECOND FILM VIA THE BONDING SYSTEM

330 — ENCAPSULATE A VOID FILL MATERIAL WITHIN VOID BETWEEN LAMINATED FIRST FILM AND SECOND FILM

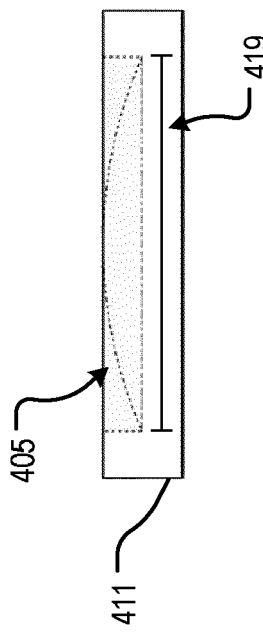
*FIG. 4A*
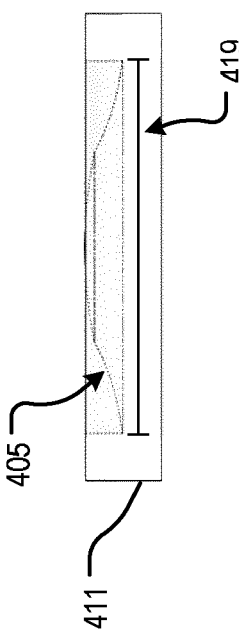
*FIG. 4B*
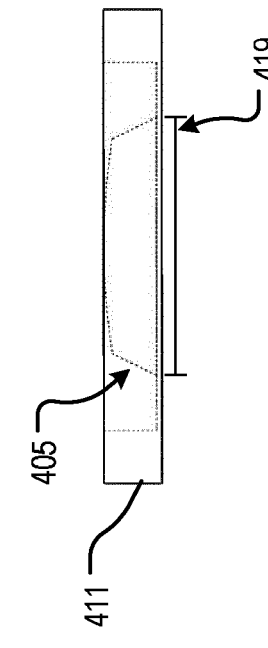
*FIG. 4C*
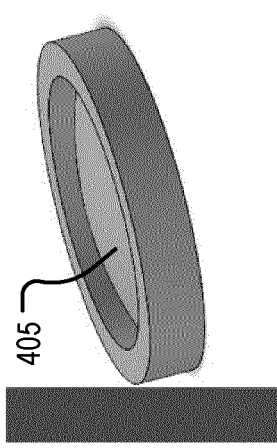
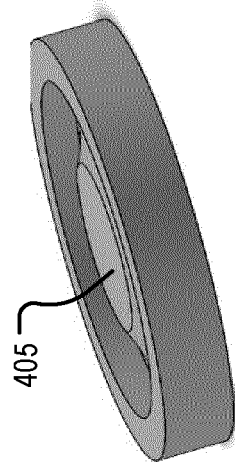
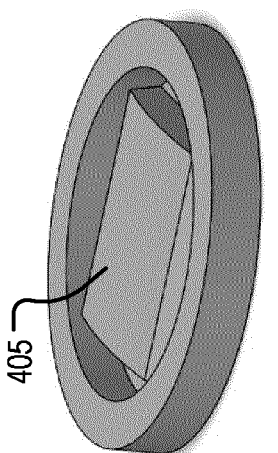

801

810

Environment

Environment

1

OPTICAL MICROSTRUCTURE-CONTAINING LAMINATE FOR OPHTHALMIC LENS INCORPORATION

CROSS-REFERENCE TO RELATED APPLICATIONS

This application is a national phase application under 35 U.S.C. § 371 of International Application No. PCT/EP2021/059582 filed 13 Apr. 2021, which claims priority to European Patent Application No. 20315169.1 filed 14 Apr. 2020. The entire contents of each of the above-referenced disclosures is specifically incorporated by reference herein without disclaimer.

BACKGROUND

Field of the Disclosure

The present disclosure relates to a laminate, comprising optical microstructures that allow for universal application to ophthalmic lenses for correction of aberrant vision.

Description of the Related Art

Myopia, also known as near-sightedness and short-sightedness, is a condition of the eye where the light that enters the eye is not focused directly on the retina. Instead, the light that enters the eye is focused in front of the retina, causing the image that the individual observes to be in or out of focus depending on a distance of an object from the eye of the individual. For instance, when an object is a distant object, the observed object will be out of focus while, when the object is a near object, the observed object will be in focus.

Though correctable by refractive surgery, myopia is most commonly corrected through the use of corrective lenses, such as glasses or contact lenses. The corrective lenses have a negative optical power (i.e., have a net concave effect), which compensates for the excessive positive diopters of the myopic eye. Negative diopters are generally used to describe a severity of a myopic condition, as this is the value of the lens to correct the vision.

Recently, efforts in addressing the progression of myopia in children and young adults have included providing optical microstructures directly on surfaces of corrective lenses. The optical microstructures may be microlenses, for instance, that redirect part of the incoming light to the retina. The use of microlenses on the surface of a regular single vision lens to introduce peripheral defocus has been shown to be very effective in slowing the progression of myopia.

To now, however, optical microstructures have been incorporated directly on surfaces of the corrective lenses. The optical microstructures may be engraved, etched, or embossed directly on either a convex surface of the corrective lens (e.g. a lens surface opposite to a lens surface adjacent to an eye of a wearer) or a concave surface of the corrective lens (e.g. a lens surface adjacent to an eye of a wearer). In one instance, this arrangement may lead to scratching or other damage to the optical microstructures as a result of everyday use. Moreover, by creating the optical microstructures directly on a lens surface of the corrective lenses, a unique design may be needed for each lens substrate material as each optical microstructure design is dependent on a change in refractive index between the optical microstructure and a surrounding medium, every lens substrate material requiring a unique set of optical designs. In this way, each lens substrate material may require a unique optical microstructure architecture and arrangement. It can be appreciated that such an approach becomes impracticable at scale and demands a more generally-applicable solution.

According to an embodiment, the present disclosure provides a solution that allows a limited number of optical microstructure designs to be used with any given material and on a variety of lens substrate materials.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

According to the claims, the present disclosure relates to a laminate and a method of generating a laminate for prevention of myopia progression.

According to an embodiment, the present disclosure further relates to a laminate, comprising a first film, of a first material having a first refractive index, including a pattern of microstructures debossed within a first surface of the first film, each microstructure of the debossed pattern of microstructures being an optical microstructure arranged such that a height of the first surface of the first film is greater than a height of each optical microstructure, and a second film, of a second material having a second refractive index, that is laminated, via a first surface of the second film, to the first film at the first surface of the first film, wherein a delta between the height of the first surface of the first film and the height of each optical microstructure encapsulates, upon the lamination of the second film to the first film, a void fill material, of a material having a predetermined refractive index, in at least a portion of at least one void defined by the delta. In an embodiment, the void fill material is an impermeable gas.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is an illustration of a lens having optical microstructures directly on a surface thereof, according to an embodiment of the present disclosure;

FIG. 4A is an illustration of an optical microstructure of a laminate including optical microstructures, according to an exemplary embodiment of the present disclosure;

FIG. 4B is an illustration of an optical microstructure of a laminate including optical microstructures, according to an exemplary embodiment of the present disclosure;

FIG. 4C is an illustration of an optical microstructure of a laminate including optical microstructures, according to an exemplary embodiment of the present disclosure;

DETAILED DESCRIPTION

Figure 2A:
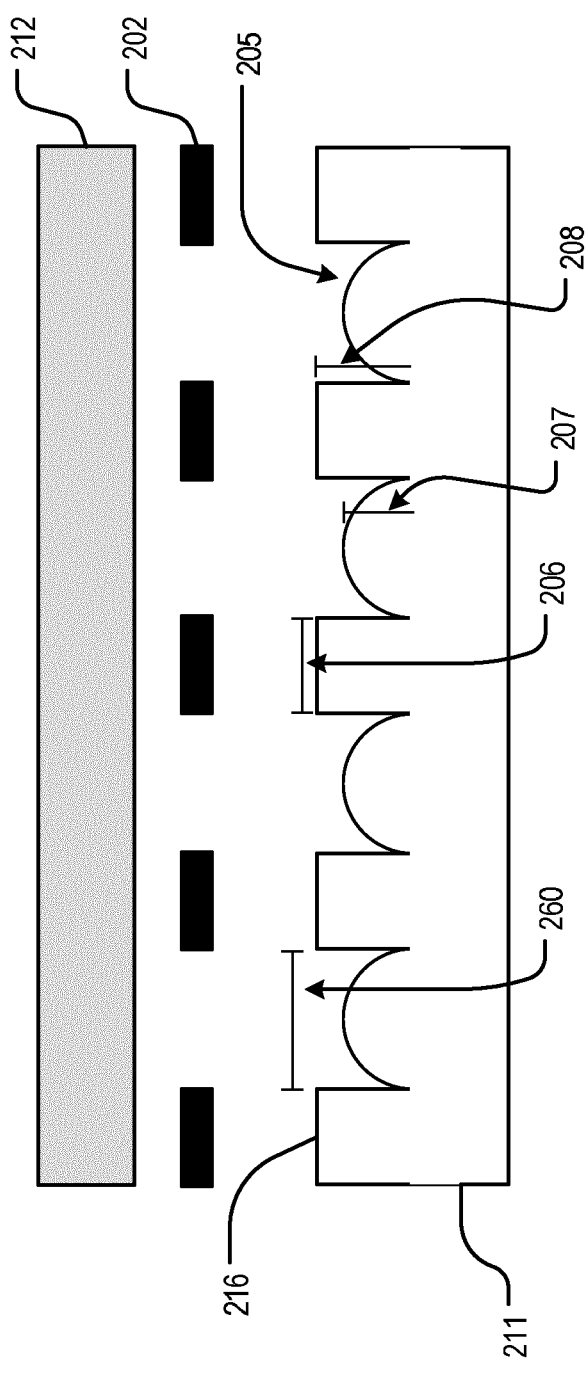
FIG. 2A is an illustration of a laminate including optical microstructures, according to an exemplary embodiment of the present disclosure.
Figure 2A:
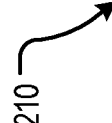

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The terms "wafer" and "laminate" may be used interchangeably to refer to a similar structure.

The terms "about" and "approximately" are defined as being close to as understood by one of ordinary skill in the art. In one non-limiting embodiment the terms are defined to be within 10%, preferably, within 5%, more preferably, within 1%, and most preferably, within 0.5%.

According to an embodiment, the present disclosure provides a solution that allows a limited number of optical microstructure designs to be used with any given material and on a variety of lens substrate materials. In effect, the present disclosure describes a laminate containing optical microstructures that may be broadly applicable via lamination to a given corrective lens.

In particular, the present invention pertains to a method to incorporate plano, flat, or curved wafers comprising laminated films that contain optical microstructures (e.g. microscale features) into the bulk or onto the surface of an optical lens (e.g., plano or powered) that is devoid of optical microstructures. In this way, the intensive design and fabrication process associated with generating unique architectures and arrangements for different lens substrate materials can be avoided in favor of a more generally applicable approach.

In an embodiment, the curved wafer, or laminate, can be a single design and material that can be used with several optical lens substrate materials. As introduced above, this approach circumvents the need for using different optical microstructure designs with different optical lens substrate materials.

According to an embodiment, the present disclosure provides a laminate designed involving encapsulation of imprinted optical microstructures within a low refractive index material, thereby providing a good refractive index within the laminate.

In an embodiment, the optical microstructure design may be a depression within a surface of a film of the wafer. The optical microstructure design may be a microlens, for instance, and may have concentric circles or other organized arrangement of patterns on the lens surface. The design of the microlens array that provides the concentric circles or other surface pattern appearance may be fixed relative to other components of the wafer. For instance, the design of the microlens may be fixed with consideration to the difference between a refractive index of the microlens material and a refractive index of a neighboring medium (e.g., a coating, an adhesive, a conformational film, etc.).

Turning now to the Figures, the above-introduced design of each optical microstructure of an array of optical micro-structures allows for application of a wafer, or a laminate, of the present disclosure to a variety of optical lens substrates. This approach is an improvement over present technology, described in FIG. 1, wherein an optical lens 101 may be directly modified through engraving, etching, embossing, coating, or other approach to provide optical microstructures 105 directly on a surface of the optical lens 101. As described, direct modification of a surface of the optical lens 101 may lead to poor visual acuity as a result of, for instance, scratching of the optical microstructures 105 disposed thereon. Accordingly, the present disclosure describes a laminate, introduced in FIG. 2A, allowing for wide use of a single architecture and arrangement of optical microstruc-tures to accommodate a variety of optical lens substrates.

With reference to FIG. 2A, a cross-sectional schematic of a laminate 210 prior to lamination, a first film 211 and a second film 212 of the laminate 210 are provided. The first film 211 may be a first material having a first refractive index. In an example, the first film 211 may be, as the first material, poly(methyl methacrylate) (PMMA), polycarbon-ate (PC), or cellulose triacetate (TAC), wherein the first material has a refractive index of approximately 1.5. The first film 211 may include, debossed within a first surface 216 of the first film 211, one or more optical microstructures 205. Each of the one or more optical microstructures 205 may have a dimensional height 207, a dimensional width 260, and may be separated from an adjacent one of the one or more optical microstructures 205 by a predetermined distance 206 that defines an area between the one or more optical microstructures 205. Each area between the one or more optical microstructures 205 may have a dimensional height 208 defining a distance between the first surface 216 of the first film 211 and a base of each of the one or more optical microstructures 205. Presented as having a hemi-spherical shape in FIG. 2A, each of the one or more optical microstructures 205 may have a variety of shapes including hemispherical, rectangular, cylindrical, pyramidal, circular, elliptical, and prismatic, among others, as demanded by a visual requirement. The curvature of each of the one or more optical microstructures 205 may be linear, curvilinear, or a combination thereof. It can be appreciated that the first film 211, having debossed within the first surface 216 thereof the one or more optical microstructures 205, provides the con-centric circles or other surface pattern appearance. The second film 212 of the laminate 210 may be a second material having a second refractive index. The second film 212 of the laminate 210 may be an optically transparent film such as PMMA, PC, TAC, cyclic olefin copolymer, and the like. In an example, the second material of the second film 212 may have a same, lower, or higher refractive index than the first refractive index. Accordingly, the second refractive index may be, for instance, 1.5, 1.4, or 1.74. It can be appreciated that the use of the phrases "lower refractive index" and "higher refractive index" reflect relative terms between the first material of the first film 211 and the second material of the second film 212. A bonding system 202 may be disposed between a first surface of the second film 212 and the first surface 216 of the first film 211. The bonding system 202 may be, among others, an adhesive system such as a pressure-sensitive adhesive or a hot-melt adhesive, a surface activation method via corona, or a surface activation method via plasma or ozone. It can be appreciated that the bonding system 202 may be applied only to contacting surfaces of the first film and the second film, as indicated by the discontinuous nature of the bonding system 202 in FIG. 2A.

Figure 2B:
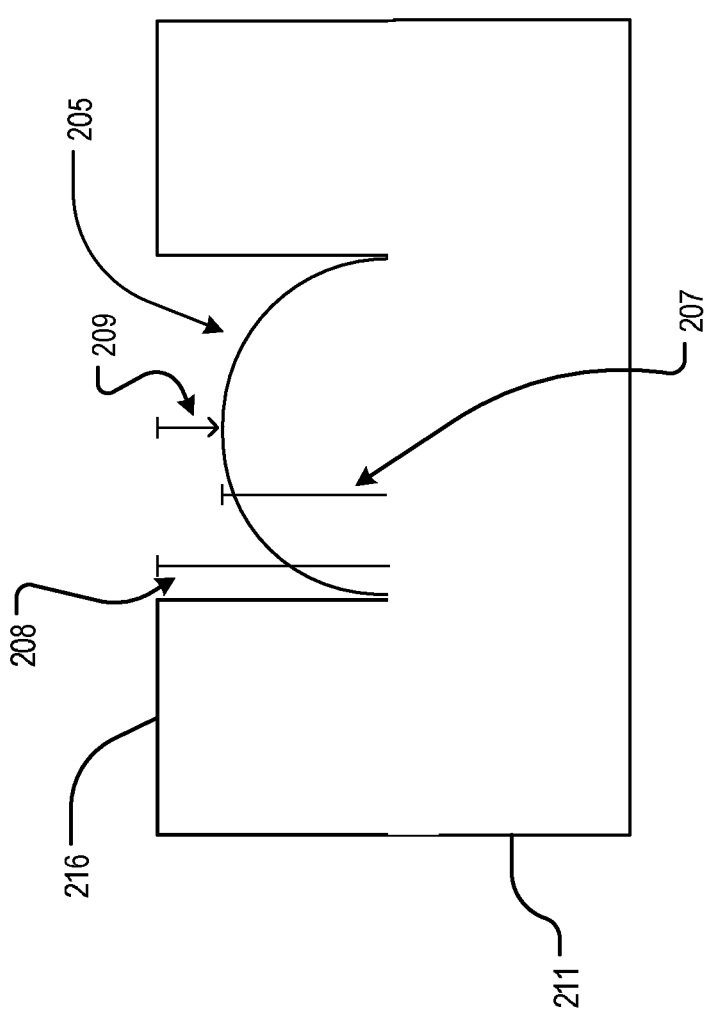
FIG. 2B is an illustration of an optical microstructure of a laminate including optical microstructures, according to an exemplary embodiment of the present disclosure.

As can be appreciated from FIG. 2B, a first film 211 of a laminate may be designed such that a magnitude of dimen-sional height 208 is greater than a magnitude of a dimen-sional height 207 of each of the one or more optical microstructures 205 of the first film 211. In this way, at least one void, or delta 209, remains between the first film 211 and a second film upon lamination thereof. In this way, follow-ing lamination, a void fill material may be encapsulated, as a neighboring medium, within at least a portion of the at least one void created by the delta 209. The void fill material may be a material having a predetermined refractive index. In an example, the void fill material may be a gel, a solid, a fluid such as a liquid or a gas, or a combination thereof. The gas may be an impermeable gas and/or may be dry air, nitrogen, argon, xenon, and the like. The predetermined refractive index of the void fill material may be 1.0.

Figure 3:
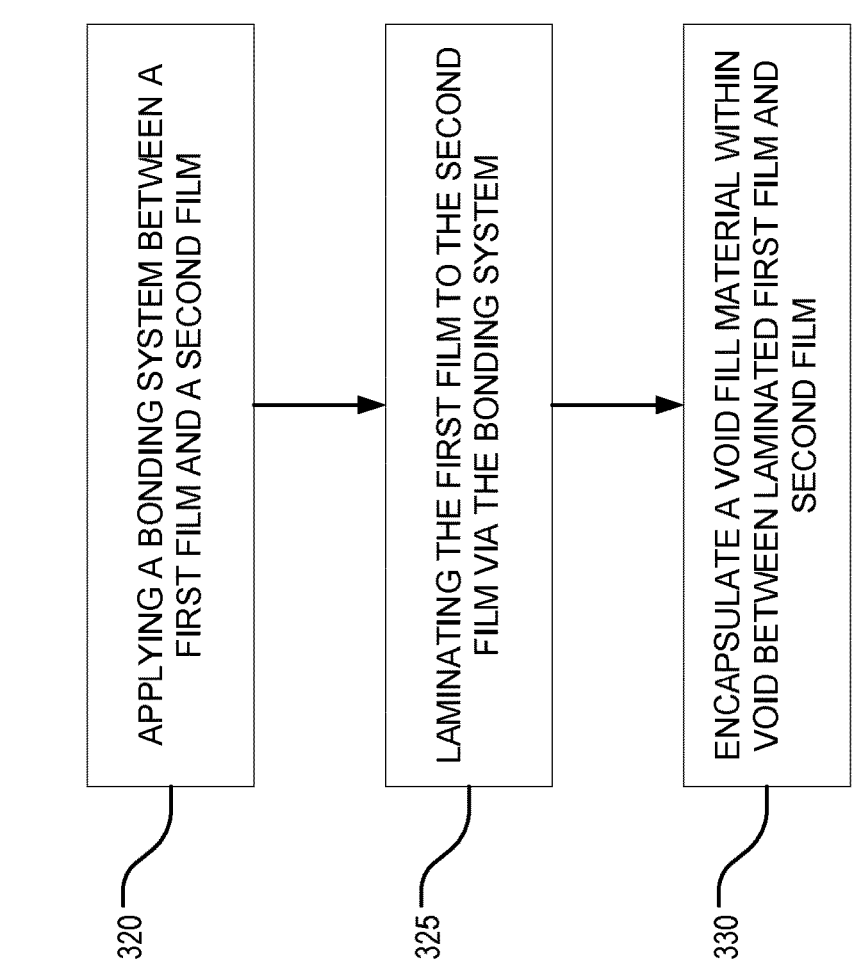
FIG. 3 is a flow diagram of a method of preparing a laminate including optical microstructures, according to an exemplary embodiment of the present disclosure.

In view of the above, and with reference to FIG. 3, lamination of the above-introduced components will be described, at a high-level. In an embodiment, lamination can be achieved by a roll-to-roll process, among others. At step 320 of method 300, a bonding system may be applied between a first film of a laminate and a second film of a laminate. The bonding system may be configured to contact a first surface of the second film and, upon lamination at step 325 of method 300, a first surface of the first film. Notably, the first surface of the first film may be discontinuous, as one or more optical microstructures may be debossed from the first surface of the first film. Following lamination, a void fill material of a material having a predetermined refractive index may be encapsulated therein at step 330 of method 300. As described, a delta between a magnitude of a dimen-sional height of each of the one or more optical microstruc-tures and a dimensional height from a base of each of the one or more optical microstructures to the first surface of the first film defines at least one void. At least a portion of the at least one void may comprise the void fill material upon lamina-tion.

According to an embodiment, following lamination described with reference to FIG. 3, a laminate may be incorporated onto a convex surface of a thermoplastic or thermoset optical lens, by methods such as front-side lami-nation (e.g. laminating a wafer on a convex surface of the lens), to produce an optical lens having optical microstruc-tures on the convex side. Such lens incorporation will be described in greater detail with reference to subsequent Figures.

According to an embodiment, one or more optical micro-structures may be disposed within a first surface of a first film by one of a plurality of methods. In one instance, a nickel-platinum plated-shim or nickel-silicon plated-shim may be used to deboss a given optical microstructure architecture and design on the first surface of the first film. The first film may be semi crystalline and heated to a temperature between a glass transition temperature ($T_g$) of the first material and a melt temperature ($T_m$) of the first material. The first film may be amorphous and heated to a temperature above a glass transition temperature ($T_g$) of the first material.

In another instance, energy-assisted imprinting may be used to stamp into the first surface of the first film to dispose the one or more optical microstructures 405 therein. The imprinting may be aided by stamping into a thin coated layer of reactive material (e.g., energy-curable material, reactive, crosslinkable, etc.) or phase-changing material (e.g., liquid to crystalline solid, liquid crystalline material) to solidify the optical microstructure into the first surface of the first film. For instance, the imprinting may use an ultraviolet process, wherein a thin-coated layer of ultraviolet-curable material is applied to the first surface of the first film, a replication stamp is used to generate a debossed pattern of optical microstructures and is then cured by ultraviolet light to solidify a pattern of the one or more optical microstructures into the first surface of the first film. While an ultraviolet process may be used, in an embodiment, thermal processes as well as E-beam processes may also be used.

In an embodiment, photolithography and/or direct write additive manufacturing may also be used to generate one or more optical microstructures within a first surface of a first film.

In an embodiment, the above-described processes may generated recessed optical microstructures (i.e. negative pattern) that may be the same material or a different material from the first film and the second film. A roll or flat plate stamp that has a mirror image (i.e. positive) of the debossed pattern of optical microstructures may be used as a template to create the pattern in fluid UV curable material. UV curing of the material may follow in order to set the pattern.

With reference to the illustrations and cross-sectional schematics of FIG. 4A through FIG. 4C, each of the one or more optical microstructures, following debossing within the first surface of the first film, may have a different architecture. Debossing may be performed by a thermal debossing process, in an example.

For instance, as in FIG. 4A, an optical microstructure 405 debossed within a first film 411 may be hemispherical, the hemispherical portion being a small portion following the intersection of a plane with a top of a sphere. Moreover, as can be observed, a dimensional width 419 of the optical microstructure 405 may occupy approximately all of a debossed area, leaving a void as a space above a surface of the optical microstructure 405. From the illustration of FIG. 4A, we can appreciate the optical microstructure 405 has a substantially circular shape when viewed from above.

FIG. 4B provides an at least partially spherical optical microstructure 405 debossed within a first film 411. As can be observed, an external curvature of the at least partially hemispherical optical microstructure 405 may be defined by more than one curvilinear element. Of course, such architecture may be defined by the needs of a given application. Similarly to FIG. 4A, a dimensional width 419 of the optical microstructure 405 may occupy approximately all of a debossed area, leaving a void to be a space above a surface of the optical microstructure 405. From the illustration of FIG. 4B, we can appreciate the optical microstructure 405 has a substantially circular shape when viewed from above.

FIG. 4C provides an optical microstructure 405 debossed within a first film 411, wherein the optical microstructure 405 has an external curvature that may be defined by a combination of curvilinear elements. Moreover, as can be observed, a dimensional width 419 of the optical microstructure 405 may occupy only a fraction of a debossed area, leaving a void to be a space adjacent to and above a surface of the optical microstructure 405. From the illustration of FIG. 4C, we can appreciate the optical microstructure 405 has a substantially square or rectangular shape when viewed from above.

Figures 4D, 4E, 4F, 4G:
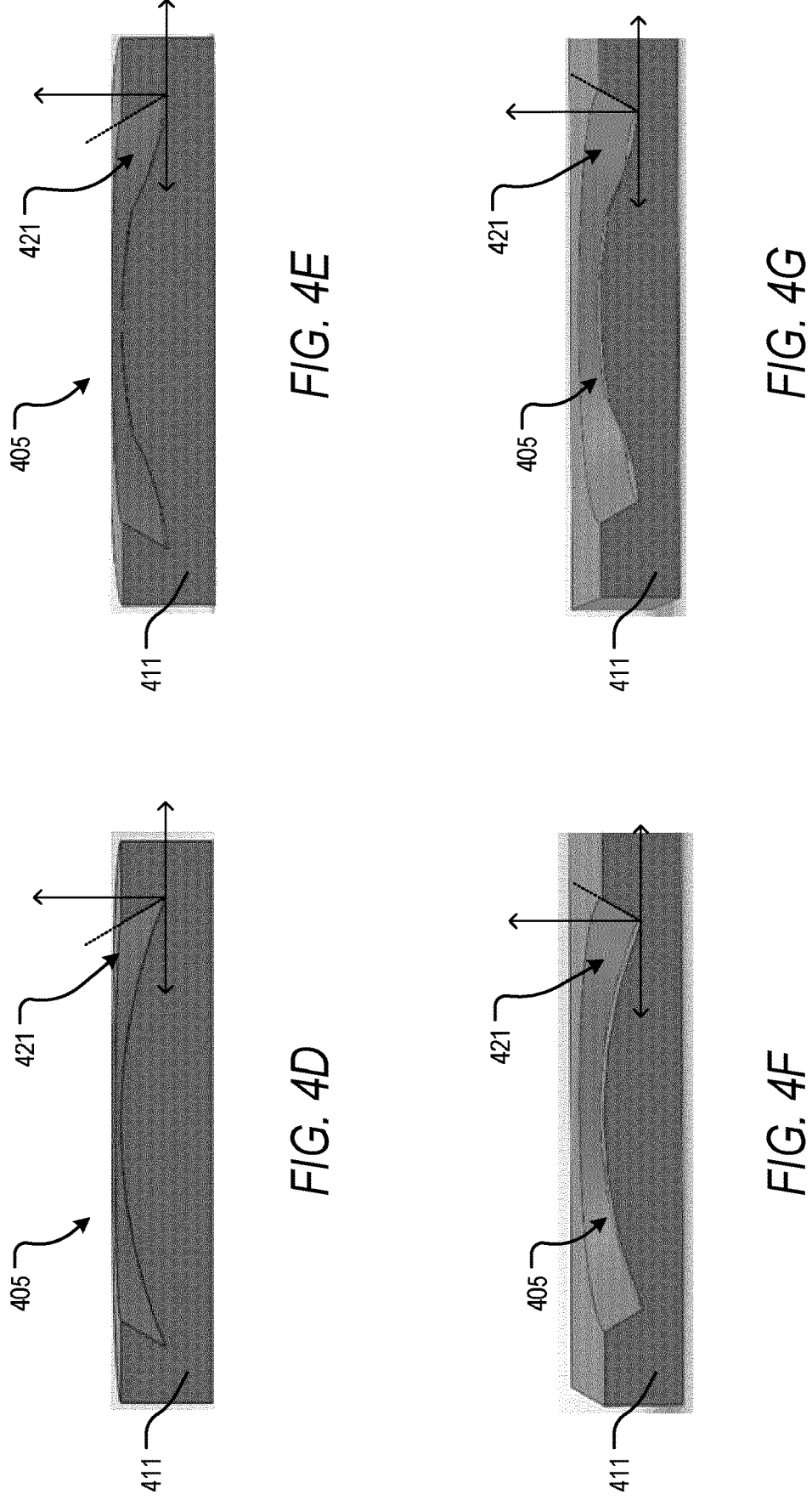
FIG. 4D is an illustration of an optical microstructure of a laminate including optical microstructures, according to an exemplary embodiment of the present disclosure.
FIG. 4E is an illustration of an optical microstructure of a laminate including optical microstructures, according to an exemplary embodiment of the present disclosure.
FIG. 4F is an illustration of an optical microstructure of a laminate including optical microstructures, according to an exemplary embodiment of the present disclosure.
FIG. 4G is an illustration of an optical microstructure of a laminate including optical microstructures, according to an exemplary embodiment of the present disclosure.

With reference to the cross-sectional illustrations of FIG. 4D through FIG. 4G, each of the one or more optical microstructures, following debossing within the first surface of the first film, may have a different architecture. For instance, as in FIG. 4D through FIG. 4G, it can be appreciated that external curvatures of certain ones of the one or more optical microstructures 405 of a first film 411 may be defined by single curvatures (FIG. 4D and FIG. 4F) while others may be defined by multiple curvilinear elements (FIG. 4E and FIG. 4G). Moreover, each optical microstructure 405 may be defined by an inner wall angle 421. As it relates to FIG. 4D and FIG. 4E, the inner wall angle 421 may be acute and may be between 30° and 90° from parallel. As it relates to FIG. 4F and FIG. 4G, the inner wall angle 421 may be obtuse and may be between 90° and 150° from parallel. Such inner wall angles can be determined in accordance with visual intents.

According to an embodiment, the one or more optical microstructures described above may be one of an array of optical microstructures. For instance, the one or more optical microstructures may appear as a linear array, a circular array, a pentagonal array, a hexagonal array, or a combination of linear arrays and/or diagonal arrays.

Figure 5:
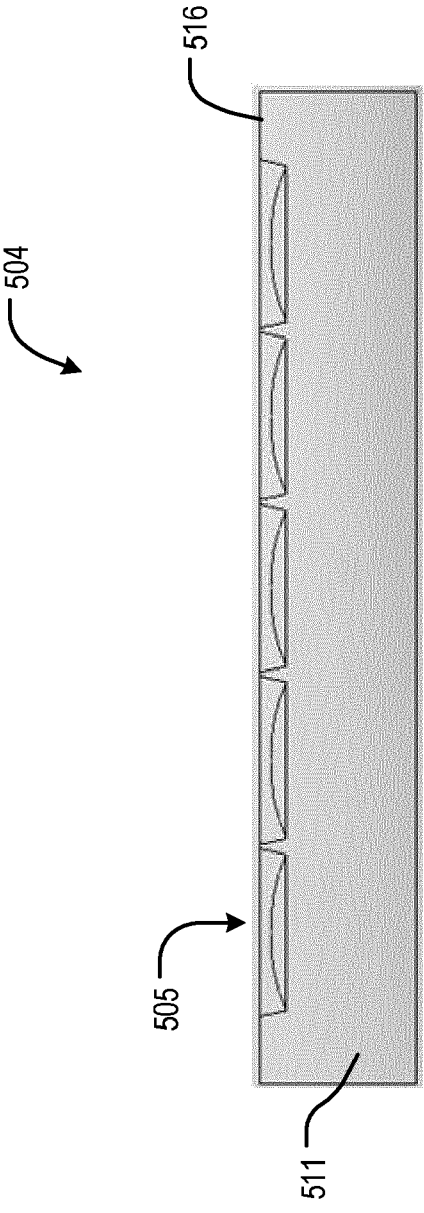
FIG. 5 is an illustration of an array of optical microstructures of a laminate including optical microstructures, according to an exemplary embodiment of the present disclosure.

In an embodiment, FIG. 5 is an illustration of a cross-sectional schematic of a linear array 504 of one or more optical microstructures 505 debossed from a first surface 516 of a first film 511. A distance between each of the one or more optical microstructures 505 of the linear array 504 may be dictated by a given application. Moreover, each linear array 504 of one or more optical microstructures 505 may be grouped together to form a larger grouping of linear or circular arrays. Alternatively, each linear array 504 may be independently arranged relative to adjacent linear arrays.

Figures 6A, 6B, 6C, 6D:
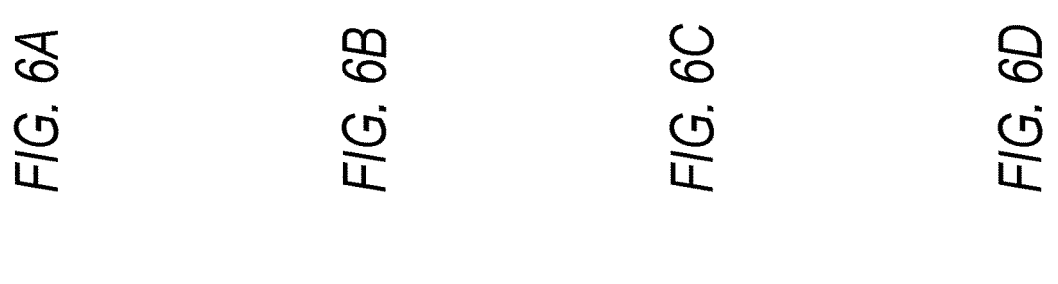
FIG. 6A is an illustration of an array of optical microstructures of a laminate including optical microstructures, according to an exemplary embodiment of the present disclosure.
FIG. 6B is an illustration of an array of optical microstructures of a laminate including optical microstructures, according to an exemplary embodiment of the present disclosure.
FIG. 6C is an illustration of an array of optical microstructures of a laminate including optical microstructures, according to an exemplary embodiment of the present disclosure.
FIG. 6D is an illustration of an array of optical microstructures of a laminate including optical microstructures, according to an exemplary embodiment of the present disclosure.

With reference now to FIG. 6A through FIG. 6D, and in view of FIG. 4D through FIG. 4G, one or more optical microstructure 605 may be debossed from a first surface 616 of a first film 611 to form a linear array 604 having predetermined architecture. The resulting film may have the appearance of a flat surface with many indentations, wherein each of the indentations is a debossed optical microstructure having the predetermined architecture. FIG. 6A and FIG. 6B each feature one or more optimal microstructures 605 debossed within a first surface 616 of a first film 611 such that each of the one or more optical microstructures 605 is spherical within a circular well. Though both are spherical, it can be observed that an inner wall of each microstructure 605 of the first film 611 of FIG. 6A is at a 90° angle relative to parallel while an inner wall of each optical microstructure 605 of the first film 611 of FIG. 6B is at angle greater than 90° relative to parallel. Similarly, FIG. 6C and FIG. 6D each feature one or more optical microstructures 605 debossed within a first surface 616 of a first film 611 such that each of the one or more optical microstructures 605 have an external curvature that includes a plurality of curvilinear elements. Moreover, as in FIG. 6A and FIG. 6B, an inner wall of each optical microstructure 605 of the first film 611 of FIG. 6C is at a 90° angle relative to parallel while an inner wall of each optical microstructure 605 of the first film 611 of FIG. 6D is at angle greater than 90° relative to parallel.

In an embodiment, and as in FIG. 6A through FIG. 6D, the inner walls of each microstructure have a dimensional height that are illustrated as circular. It can be appreciated, however, that other shapes including elliptical, square, rectangular, pentagonal, and hexagonal, among others, are appropriate.

Having established the architecture of the first film of the laminate, description turns to fabrication of the laminate including a first film and a second film.

To this end, a two-ply laminate construction may be used. A first film of a first material having a first refractive index may be provided, the first film including one or more optical microstructures. The one or more optical microstructures may be imprinted within the first film. The one or more optical microstructures may have a same or different refractive index than the first refractive index of the first material of the first film. A second film of a second material having a second refractive index may be laminated on a first surface of the first film. The lamination may be performed by a variety of methods. In an embodiment, an air blower or nitrogen purge blower may be applied, prior to lamination of the second film to the first surface of the first film, to the first surface of the film. In this way, the air blower or nitrogen purge blower may provide a void fill material of a material having a predetermined refractive index. The void fill material may, when the second film is laminated to the first film, be encapsulated within at least a portion of at least one void of the laminate.

In an embodiment, laminating the second film and the first film may require application of a bonding system between a first surface of the second film and a first surface of the first film. Application of the bonding system may be performed via slot die coater, roll coater, knife over roll coater, or any type of pattern coater to cover contacting areas of the first surface of the first film and contacting areas of the first surface of the second film. Following application of the bonding system, the second film may be laminated to the first film and a void fill material may be encapsulated therebetween. The void fill material may be an impermeable gas and/or may be one of dry air, nitrogen, xenon, or other noble gas. The bonding system may be an adhesive system and may include a water-based, solvent-based, solvent-less, pressure sensitive, or hot melt assisted adhesive. For a first coating type and a second coating type, a volatile carrier (e.g., water, solvent) may evaporate and leave a residue of coating solids. For a third coating type, one of thermal curing, ultraviolet curing, E-beam curing, and the like, may be used for curing. Examples of materials used for the third coating type including acrylics, epoxies, urethanes, cyclic anhydrides, MR-8, having a refractive index of ~1.60, MR-10, having a refractive index of ~1.67, and similar plastics having a refractive index of between ~1.70 and ~1.74. Alternatively, the bonding system may be a non-adhesive bonding system such as, for example, a surface activation system that may activated via plasma, corona, ozone, or other method used to bond one surface to another.

Figure 7A:
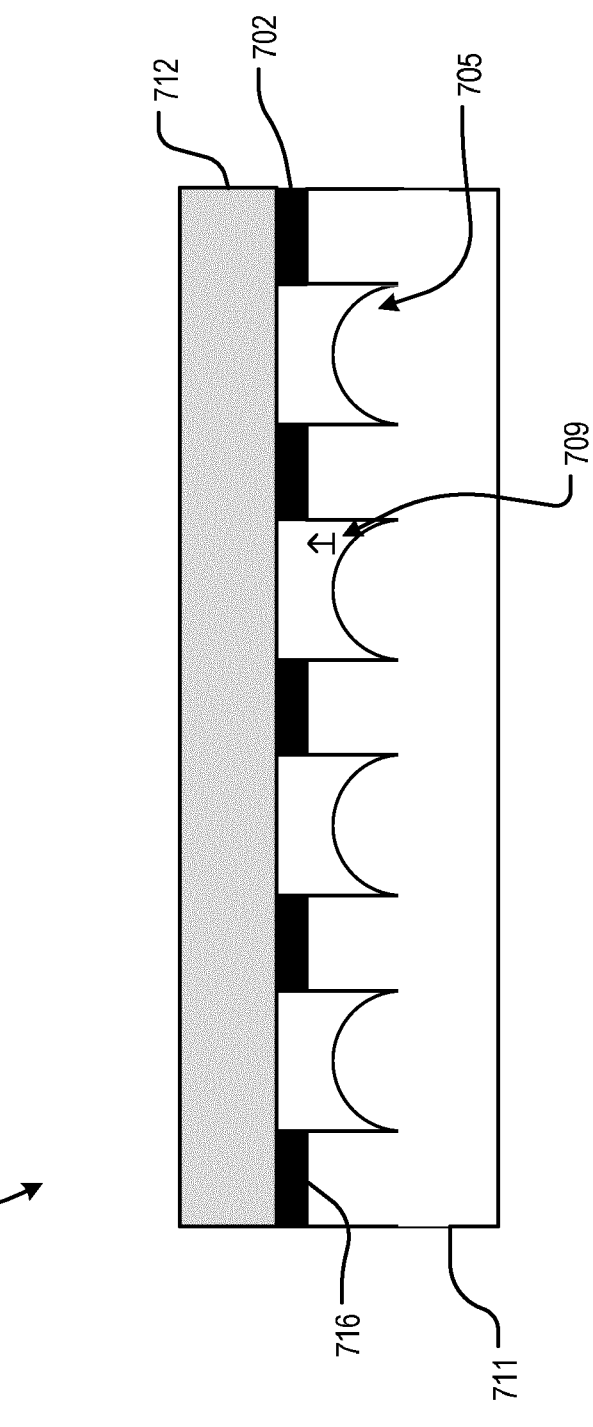
FIG. 7A is an illustration of a laminate including optical microstructures, according to an exemplary embodiment of the present disclosure.

According to an embodiment, lamination may be performed as described with reference to FIG. 7A. As in FIG. 7A, a laminate 710 may include a first film 711 of a first material having a first refractive index and may include one or more optical microstructures 705 debossed from a first surface 716 of the first film 711. The laminate 710 may include a second film 712 of a second material having a second refractive index. Upon lamination, a void fill material of a material having a predetermined refractive index may be encapsulated between the first film 711 and the second film 712, the void fill material occupying at least a portion of at least one void defined by a delta 709 between a magnitude of a dimensional length of one of the one or more optical microstructures 705 and a dimensional length from a base of one of the one or more optical microstructures 705 to the first surface 716 of the first film 711. In an embodiment, a bonding system 702 may be provided between contacting surfaces of the first film 711 and the second film 712. The void fill material may be a gel, a solid, a fluid such as a liquid or a gas, or a combination thereof. In an example, the void fill material may be an impermeable gas. It can be appreciated that the bonding system 702 provides negligible thickness following lamination. The laminate may be formed by, in an example, nanoimprinting patterns into each side of a single film in a roll-to-roll process.

Figure 7B:
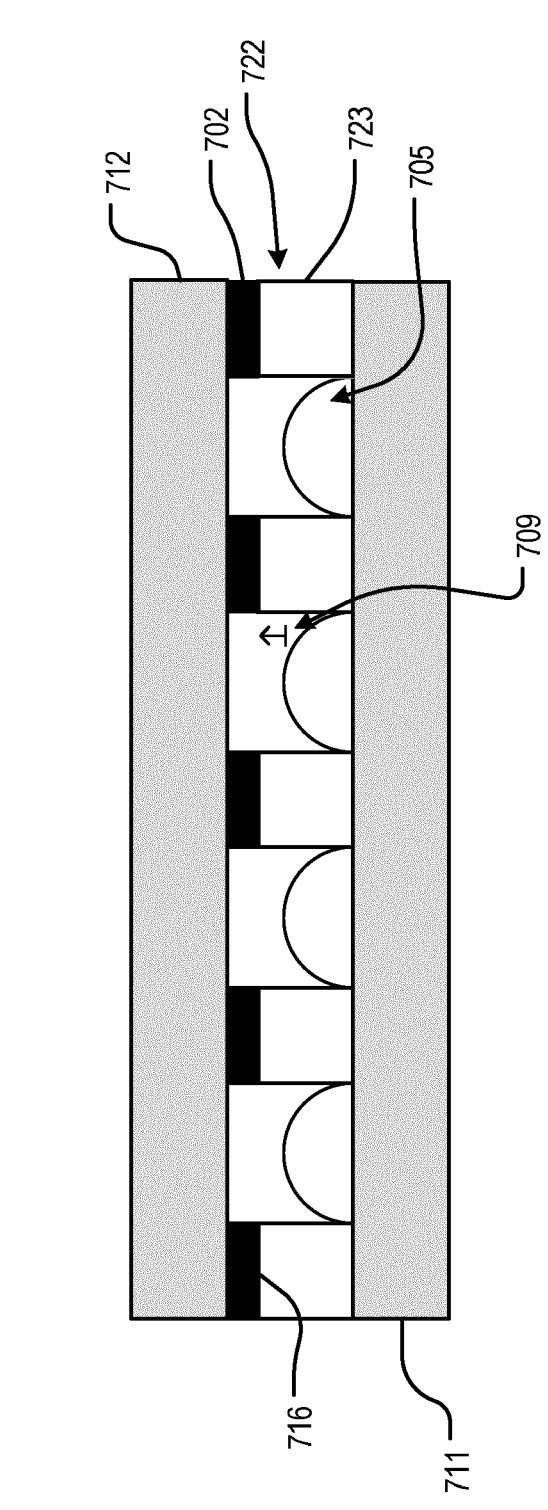
FIG. 7B is an illustration of a laminate including optical microstructures, according to an exemplary embodiment of the present disclosure.

According to an embodiment, lamination may be performed as described with reference to FIG. 7B. As in FIG. 7B, a laminate 710 may include a first film 711 of a first material having a first refractive index. The laminate 710 may include a second film 712 of a second material having a second refractive index. The first material and the second material may be a same material, in an example. A coating may be applied to a first surface 716 of the first film 711 to generate one or more optical microstructures 705 and adjacent wall portions 723 thereon. The coating may be, in an example, an ultraviolet coating or a thermal coating. The coating may be achieved by a slot die coater or a differential offset gravure coater. Upon lamination, a void fill material of a material having a predetermined refractive index may be encapsulated between the first film 711 and the second film 712, the void fill material occupying at least a portion of at least one void defined by a delta 709 between a magnitude of a dimensional length of one of the one or more optical microstructures 705 and a dimensional length from a base of one of the one or more optical microstructures 705 to the first surface 716 of the first film 711. In an embodiment, a bonding system 702 may be provided between contacting surfaces of the first film 711 and the second film 712. The void fill material may be a gel, a solid, a fluid such as a liquid or a gas, or a combination thereof. The void fill material may be an impermeable gas. It can be appreciated that the bonding system 702 provides negligible thickness following lamination. The laminate may be formed by, in an example, nanoimprinting patterns into each side of a single film in a roll-to-roll process.

Figure 8A:
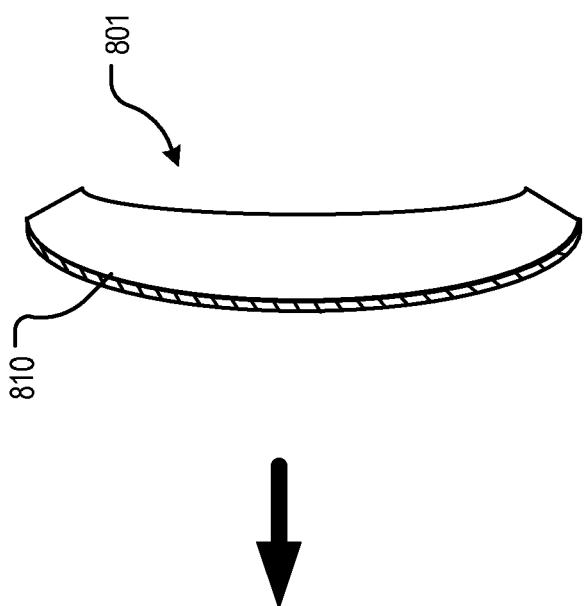
FIG. 8A is an illustration of a lens having a laminate including optical microstructures laminated thereto, according to an exemplary embodiment of the present disclosure.
Figure 8B:
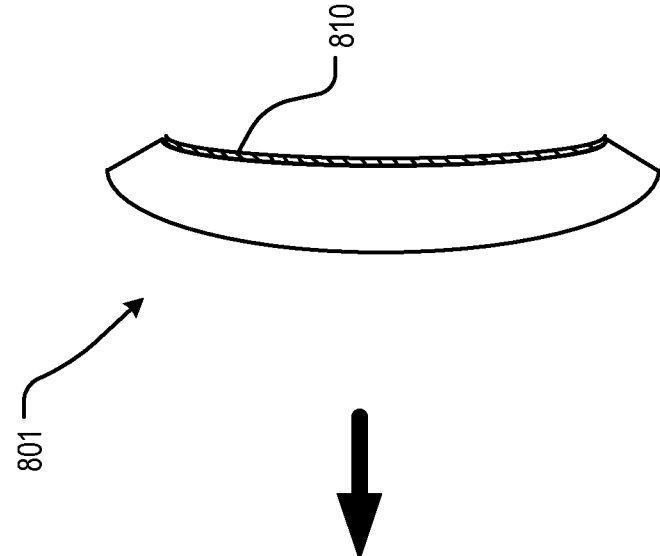
FIG. 8B is an illustration of a lens having a laminate including optical microstructures laminated thereto, according to an exemplary embodiment of the present disclosure.

With reference now to FIG. 8A and FIG. 8B, any one of the above-described laminates, as a non-limiting group, may be cut, formed into curved wafers, and incorporated into an optical lens 801. The incorporation of a laminate 810, including optical microstructures, may be performed by, among other techniques, injection over-molding, wafer casting (i.e., on-surface or in-lens), or pressure and/or heat assisted "front-side lamination" and/or "back-side lamination" onto existing semi-finished and/or finished lenses. Any one of the above-identified techniques may require one or both surfaces of the laminate to contain, or be coated with, a primer layer or adhesive layer (e.g., pressure-sensitive adhesive, hot-melt adhesive) to facilitate adhesion to the lens substrate material. As in FIG. 8A, a laminate 810 may be adhered to a convex surface of an optical lens 801, thus arranging the laminate 810 opposite a surface of the optical lens 801 adjacent an eye of an eyeglass wearer. As in FIG. 8B, a laminate 810 may be adhered to a concave surface of an optical lens 801, thus arranging the laminate 810 on a surface of the optical lens 801 adjacent an eye of an eyeglass wearer. The optical lens 810 may be an existing thermoplastic lens or a thermoset lens.

Figure 9:
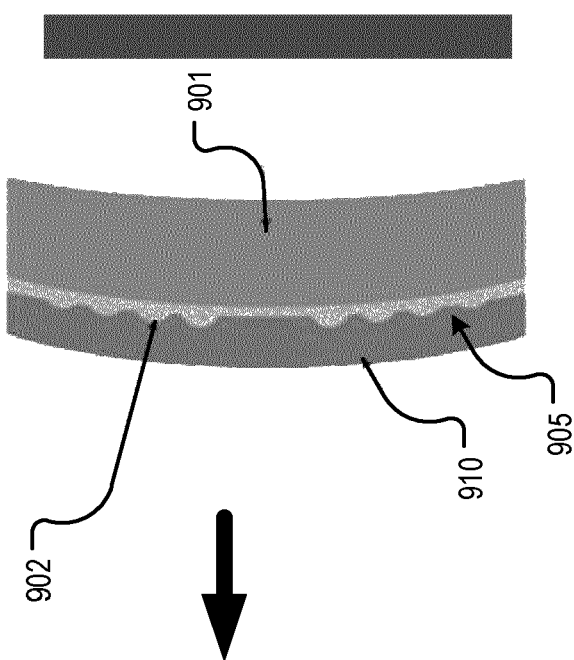
FIG. 9 is an illustration of a lens having a laminate including optical microstructures laminated thereto via adhesive, according to an exemplary embodiment of the present disclosure.
Figure 9:

According to an embodiment, and with reference to FIG. 9, a laminate, or wafer 910, including one or more optical microstructures 905 and having refractive index $RI_{wafer}$, may be prepared according to a concave surface of an optical lens 901 and then laminated onto a convex surface of the optical lens 901. The optical lens 901 may have refractive index $RI_{lens}$. The one or more optical microstructures may be microlenses and, in particular, microlenses of the Fresnel-lens type. The lamination may be facilitated by use of an adhesive 902, as a bonding system, of refractive index $RI_{adh}$. The adhesive may be a water-based adhesive, solvent-based adhesive, or solvent-less adhesive, as appropriate. Of course, as an alternative, a laminate 910 may be prepared according to a convex surface of an optical lens 901 and then laminated onto the concave surface of the optical lens 901, as desired.

In an embodiment, the resulting diopter powers of the one or more optical microstructures is dependent upon $\Delta RI=$ ($RI_{wafer}-RI_{adh}$) and is independent of $RI_{lens}$, assuming that $RI_{wafer}\neq RI_{adh}$. In this way, it can be appreciated that substrate material is immaterial to the function of the laminate when the laminate and the adhesive are carefully selected.

According to an embodiment, the laminate may be produced by, in addition to the methods described above, injection molding. The lamination step can be performed during injection molding of an optical thermoplastic lens by an in-mold lamination process, thus making the process scalable for mass production. Additionally, the lamination may be carried out in a prescribing lab by "front-side lamination" or "back-side lamination" based upon the desired result.

In other words, a variety of fabrication methods are available and applicable. In at least one approach, a laminate, as described above, may be positioned within a mold prior to forming an optical lens. In at least one approach, a laminate can be adhered and/or bonded to an already formed optical lens. For instance, in order to form thermoplastic polycarbonate (PC) lenses, a laminate can be over-molded on a convex surface of the lens, or, described differently, a molten PC may be injected behind the laminate. In another instance, for thermoset cast lenses, a laminate can be positioned on a surface of a casting mold or the laminate may be offset from the surface of the casting mold by 0.1 mm to 1.0 mm. In this way, a void therebetween may be filled with thermoset monomers/resin and allowed to cure. In this instance, a primer layer may be required to allow a surface of the laminate to bond to the thermoset monomers/resin.

According to an embodiment, and in addition to the above, "front-side lamination" and/or "back-side lamination" may be performed by one of two methods. In one instance, a laminate may be permanently adhered and/or bonded to either the convex surface or the concave surface of an existing thermoplastic or thermoset lens. In another instance, a laminate may be temporarily fastened, as a patch or other temporary fixture, to either the convex surface or the concave surface of an existing thermoplastic or thermoset lens.

Figure 10:
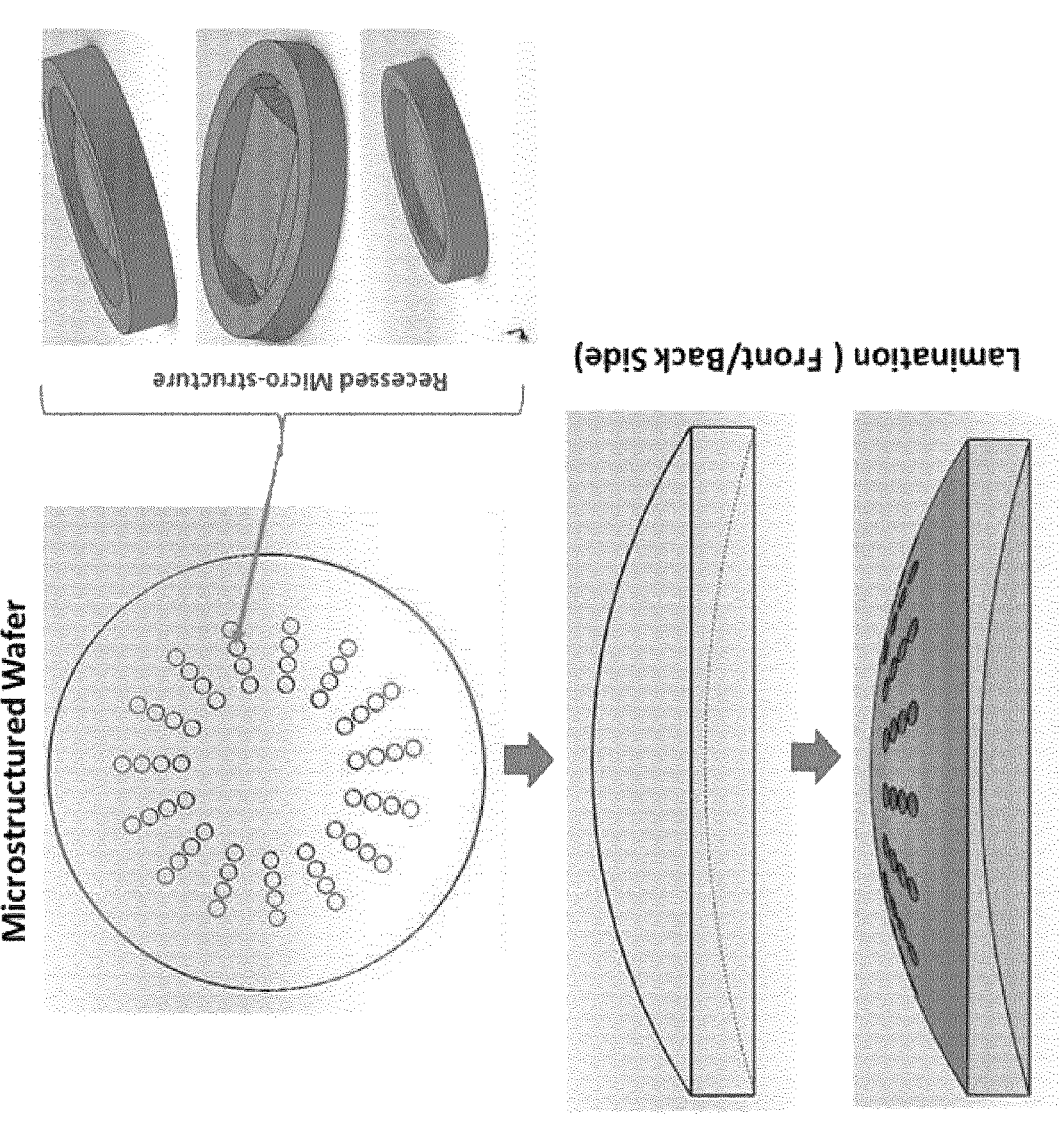
FIG. 10 is an illustration of a flow diagram of an optical microstructure of a laminate including optical microstructures laminated to a lens, according to an exemplary embodiment of the present disclosure.

According to an embodiment, any of the above described laminates can be cut and formed into curved wafers and incorporated into a lens. FIG. 10 provides exemplary images of multiple arrays of optical microstructures incorporated within a lens assembly.

As can be observed in FIG. 10, a normal view of a laminate wafer with debossed one or more optical microstructures is shown with a corresponding example of the process of incorporating it onto an optical lens. The optical lens may be a semi-finished (SF) lens or finished (F) lens. A base curvature of the optical lens may be between 1.25 Diopters and 8.50 Diopters. In FIG. 10, the laminate may be incorporated with the optical lens, as described above. For instance, via injection over-molding, the laminate may be mechanically thermoformed using a LEMA forming process machine and subsequently placed onto a convex side of an injection molding cavity. Thermoplastic material heated to between 100° C. and 300° C. may be injected onto the laminate, thereby creating an instant fusion between the laminate and the heated thermoplastic material. In some situations, a primer layer or other adhesion promoting layer may be required to bond the wafer to the thermoplastic or thermoset material. The incorporated laminate and SF or F lens may be ejected, wherein the laminate, including one or more optical microstructures, may be on the convex side of the optical lens. In another instance, via "front-side lamination" or "back-side lamination", the laminate may be adhered onto a surface of a thermoplastic or thermoset molded optical lens. The adherence may be aided by an adhesive backing material on either a concave surface of the optical lens or a convex surface of the optical lens. The adhesive backing material may be an ultraviolet-based material, a solvent-based material, a solvent-less material, a pressure sensitive adhesive, a hot-melt adhesive, and the like.

The above description of FIG. 10 describes a flow diagram indicating incorporation of one or more debossed optical microstructure (e.g., recessed micro-structure) within a laminate (e.g., microstructured wafer) and subsequent lamination to a surface of an optical lens. It can be appreciated from FIG. 10 that arranging multiple arrays of optical microstructures allows for different geometric arrangements thereof.

Figure 11C:
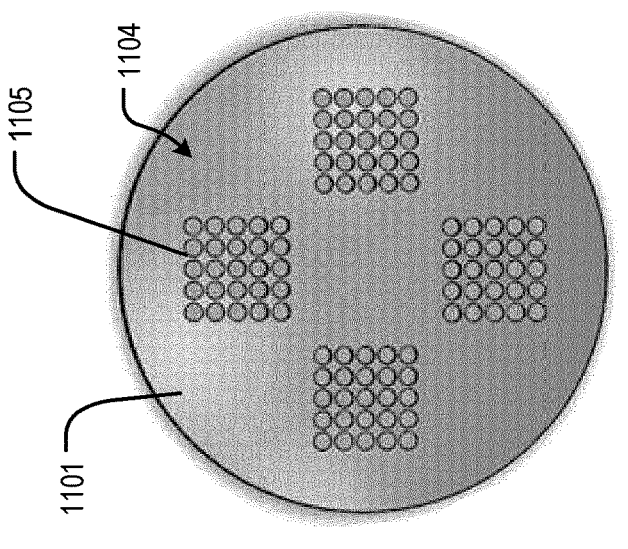
FIG. 11C is an illustration of a surface of lens laminated with a laminate including optical microstructures, according to an exemplary embodiment of the present disclosure.
Figure 11B:
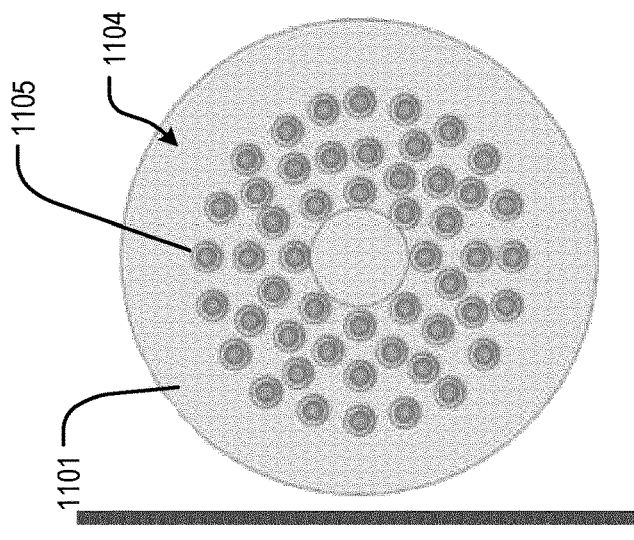
FIG. 11B is an illustration of a surface of lens laminated with a laminate including optical microstructures, according to an exemplary embodiment of the present disclosure.
Figure 11A:
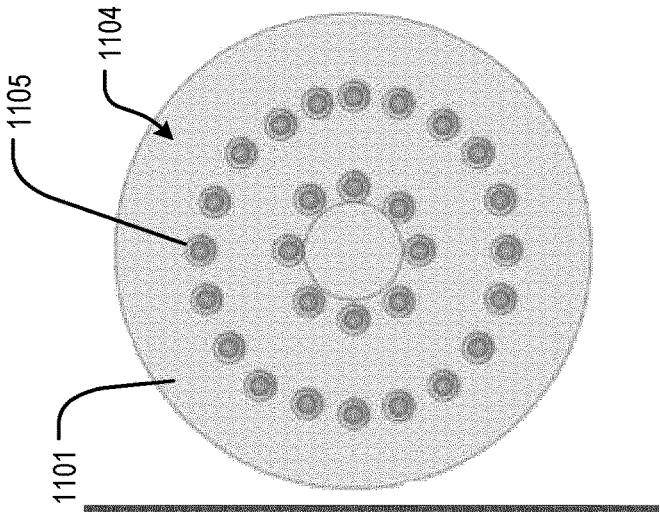
FIG. 11A is an illustration of a surface of lens laminated with a laminate including optical microstructures, according to an exemplary embodiment of the present disclosure.

Accordingly, FIG. 11A through FIG. 11C provide illustrations of one or more optical microstructures 1105 on a surface of an optical lens 1101. Arrangements of one or more optical microstructures 1105 may be symmetric, as in FIG. 11A, or may be random, as in FIG. 11B. The one or more optical microstructures 1105 may be included within one or more arrays 1104. As in FIG. 11C, the one or more optical microstructures 1105 may be arranged as arrays 1104 within dispersed colonies of one or more optical microstructures 1105. The one or more optical microstructures 1105 can be populated in colonies, or clusters (e.g., rectangular, squared, and circular), or may be in a diagonal arrangement.

According to an embodiment, with reference to FIG. 11A through FIG. 11C, functional efficacy may depend on an efficiency of an optical microstructure design and its degree of coverage on a surface of an optical lens. For example, if the functional efficiency of an optical microstructure design is 75%, but it covers only 25% of the total surface of the optical lens, then only 19% of the total incident light will be affected. However, if 25% coverage of the surface of the optical lens indicates that a quarter section (e.g., from 0° to 90°) of the optical lens is fully covered, and the other 75% of the optical lens does not contain microstructures (e.g., 90° to 360° with 0% coverage), then light impinging on the covered quarter section will be 75% affected. This may be useful in situations where light coming in from the left is desirable to modify light coming into the left eye. A similar scenario may be considered for the right eye.

According to an embodiment, the laminate of the present disclosure may be used in the manufacture of adaptable single vision lenses targeting children and young adults for myopia control and prevention. Use in the manufacturing of thin single layered or multi-layered laminates as a discontinuous surface for light management and control aims to resolve issues pertaining to poor visual acuity and/or other health concerns related to the eye.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) A laminate, comprising a first film, of a first material having a first refractive index, including a pattern of microstructures debossed within a first surface of the first film, each microstructure of the debossed pattern of microstructures being an optical microstructure arranged such that a height of the first surface of the first film is greater than a height of each optical microstructure, and a second film, of a second material having a second refractive index, that is laminated, via a first surface of the second film, to the first film at the first surface of the first film, wherein a delta between the height of the first surface of the first film and the height of each optical microstructure encapsulates, upon the lamination of the second film to the first film, a void fill material, of a material having a predetermined refractive index, in at least a portion of at least one void defined by the delta.

(2) The laminate according to (1), wherein the laminate is laminated to a convex surface of a lens, the convex surface of the lens being opposite a surface of the lens adjacent an eye of a lens wearer, a second surface of the first film being in contact with the convex surface of the lens.

(3) The laminate according to either of (1) or (2), wherein the laminate is laminated to a convex surface of a lens, the convex surface of the lens being opposite a surface of the lens adjacent an eye of a lens wearer, a second surface of the second film being in contact with the convex surface of the lens.

(4) The laminate according to any one of (1) to (3), further comprising an adhesive applied to contact areas between the first surface of the first film and the first surface of the second film.

(5) The laminate according to any one of (1) to (4), wherein the first refractive index of the first material is different from the predetermined refractive index of the void fill material.

(6) The laminate according to any one of (1) to (5), wherein the first refractive index of the first material is greater than 1.4.

(7) The laminate according to any one of (1) to (6), wherein the first material of the first film and the second material of the second film are a same thermoplastic.

(8) The laminate according to any one of (1) to (7), wherein the void fill material is an impermeable gas.

(9) A method of generating a laminate, comprising laminating a first surface of a first film to a first surface of a second film, the first film being a first material having a first refractive index and including a pattern of microstructures debossed within the first surface of the first film, the second film being a second material having a second refractive index, wherein each microstructure of the debossed pattern of microstructures of the first surface of the first film is an optical microstructure arranged such that a height of the first surface of the first film is greater than a height of each optical microstructure, and a delta between the height of the first surface of the first film and the height of each optical microstructure encapsulates, upon the laminating the first surface of the first film to the first surface of the second film, a void fill material, of a material having a predetermined refractive index, in at least a portion of at least one void defined by the delta.

(10) The method according to (9), further comprising laminating the laminate to a convex surface of a lens, the convex surface of the lens being opposite a surface of the lens adjacent an eye of a lens wearer, a second surface of the first film being in contact with the convex surface of the lens.

(11) The method according to either (9) or (10), further comprising laminating the laminate to a convex surface of a lens, the convex surface of the lens being opposite a surface of the lens adjacent an eye of a lens wearer, a second surface of the second film being in contact with the convex surface of the lens.

(12) The method according to any one of (9) to (11), wherein the laminating includes applying an adhesive to contact areas between the first surface of the first film and the first surface of the second film.

(13) The method according to any one of (9) to (12), wherein the first refractive index of the first material is different from the predetermined refractive index of the void fill material.

(14) The method according to any one of (9) to (13), wherein the first film and the second film are of a same thermoplastic.

(15) The method according to any one of (9) to (14), wherein the void fill material is an impermeable gas.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A laminate configured to be used on a lens substrate material for correction of aberrant vision, comprising:
   a first film, of a first material having a first refractive index, including a pattern of microstructures debossed within a first surface of the first film, each microstructure of the debossed pattern of microstructures being an optical microstructure arranged such that a height of the first surface of the first film is greater than a height of each optical microstructure; and
   a second film, of a second material having a second refractive index, that is laminated, via a first surface of the second film, to the first film at the first surface of the first film, wherein
   a delta between the height of the first surface of the first film and the height of each optical microstructure encapsulates, upon the lamination of the second film to the first film, a void fill material, of a material having a predetermined refractive index, in at least a portion of at least one void defined by the delta;
   wherein the void fill material is selected from:
      a gel,
      a solid,
      a fluid that is a fluid or a gas, said gas being nitrogen, argon, or xenon,
      or a combination thereof.

2. The laminate according to claim 1, wherein the laminate is laminated to a convex surface of a lens, the convex surface of the lens being opposite a surface of the lens adjacent an eye of a lens wearer, a second surface of the first film being in contact with the convex surface of the lens.

3. The laminate according to claim 1, wherein the laminate is laminated to a convex surface of a lens, the convex surface of the lens being opposite a surface of the lens adjacent an eye of a lens wearer, a second surface of the second film being in contact with the convex surface of the lens.

4. The laminate according to claim 1, further comprising an adhesive applied to contact areas between the first surface of the first film and the first surface of the second film.

5. The laminate according to claim 1, wherein the first refractive index of the first material is different from the predetermined refractive index of the void fill material.

6. The laminate according to claim 1, wherein the first refractive index of the first material is greater than 1.4.

7. The laminate according to claim 1, wherein the first material of the first film and the second material of the second film are a same thermoplastic.

8. The laminate according to claim 1, wherein the void fill material is an impermeable gas.

9. A method of generating a laminate configured to be used on a lens substrate material for correction of aberrant vision, comprising:

laminating a first surface of a first film to a first surface of a second film, the first film being a first material having a first refractive index and including a pattern of microstructures debossed within the first surface of the first film, the second film being a second material having a second refractive index, wherein each microstructure of the debossed pattern of microstructures of the first surface of the first film is an optical microstructure arranged such that a height of the first surface of the first film is greater than a height of each optical microstructure, and a delta between the height of the first surface of the first film and the height of each optical microstructure encapsulates, upon the laminating the first surface of the first film to the first surface of the second film, a void fill material, of a material having a predetermined refractive index, in at least a portion of at least one void defined by the delta; wherein the void fill material is selected from:

a gel, a solid, a fluid that is a fluid or a gas, said gas being nitrogen, argon, or xenon, or a combination thereof.

10. The method according to claim 9, further comprising laminating the laminate to a convex surface of a lens, the convex surface of the lens being opposite a surface of the lens adjacent an eye of a lens wearer, a second surface of the first film being in contact with the convex surface of the lens.

11. The method according to claim 9, further comprising laminating the laminate to a convex surface of a lens, the convex surface of the lens being opposite a surface of the lens adjacent an eye of a lens wearer, a second surface of the second film being in contact with the convex surface of the lens.

12. The method according to claim 9, wherein the laminating includes applying an adhesive to contact areas between the first surface of the first film and the first surface of the second film.

13. The method according to claim 9, wherein the first refractive index of the first material is different from the predetermined refractive index of the void fill material.

14. The method according to claim 9, wherein the first film and the second film are of a same thermoplastic.

15. The method according to claim 9, wherein the void fill material is an impermeable gas.

* * * * *